US012332599B2

(12) United States Patent
Ueda et al.

(10) Patent No.: US 12,332,599 B2
(45) Date of Patent: Jun. 17, 2025

(54) TONER

(71) Applicant: CANON KABUSHIKI KAISHA, Tokyo (JP)

(72) Inventors: Miki Ueda, Tokyo (JP); Takeshi Hashimoto, Ibaraki (JP); Kazuki Murata, Tokyo (JP); Megumi Shino, Chiba (JP); Yukihiro Abe, Chiba (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 592 days.

(21) Appl. No.: 17/663,935

(22) Filed: May 18, 2022

(65) Prior Publication Data

US 2022/0404727 A1 Dec. 22, 2022

(30) Foreign Application Priority Data

Jun. 11, 2021 (JP) ................................ 2021-098008
May 10, 2022 (JP) ................................ 2022-077314

(51) Int. Cl.
*G03G 9/087* (2006.01)

(52) U.S. Cl.
CPC ................................ *G03G 9/08746* (2013.01)

(58) Field of Classification Search
CPC ........... G03G 9/08746; G03G 9/08711; G03G 9/08724; G03G 9/09716
See application file for complete search history.

(56) References Cited

U.S. PATENT DOCUMENTS 9,057,970 B2 6/2015 Ida
9,152,088 B1 10/2015 Kobori
9,348,247 B2 5/2016 Ida
9,348,253 B2 5/2016 Kanno
9,417,540 B2 8/2016 Hashimoto
9,436,112 B2 9/2016 Iwasaki
9,540,483 B2 1/2017 Ida
9,651,883 B2 5/2017 Hama
9,665,026 B2 5/2017 Iwasaki
9,696,644 B2 7/2017 Ida
9,897,934 B2 2/2018 Tamura
10,012,920 B2 7/2018 Shibata
10,036,970 B2 7/2018 Kanno
10,078,281 B2 9/2018 Ida
10,082,743 B2 9/2018 Hama
10,088,765 B2 10/2018 Miyakai
10,146,146 B2 12/2018 Komatsu
10,175,595 B2 1/2019 Onozaki
10,197,936 B2 2/2019 Onozaki
10,203,619 B2 2/2019 Yamashita
10,228,629 B2 3/2019 Tamura
10,274,851 B2 4/2019 Hashimoto
10,353,312 B2 7/2019 Kamae
10,401,748 B2 9/2019 Hashimoto
10,423,086 B2 9/2019 Hama
10,451,986 B2 10/2019 Sano
10,451,990 B2 10/2019 Kamae
10,474,049 B2 11/2019 Onozaki
10,514,624 B2 12/2019 Tamura
10,564,560 B2 2/2020 Onozaki
10,599,060 B2 3/2020 Kanno
10,656,545 B2 5/2020 Kamae
10,775,710 B1 9/2020 Kamae
10,859,931 B2 12/2020 Hashimoto
10,877,386 B2 12/2020 Murayama
(Continued)

FOREIGN PATENT DOCUMENTS

JP 2014-66994 A 4/2014
WO WO2007080826 A1 * 7/2007 ........... G03G 9/0821

OTHER PUBLICATIONS

U.S. Appl. No. 17/654,461, Yukihiko Abe, filed Mar. 11, 2022,
U.S. Appl. No. 17/654,481, Kazuki Murata, filed Mar. 11, 2022,
U.S. Appl. No. 17/656,282, Takeshi Hashimoto, filed Mar. 24, 2022,
U.S. Appl. No. 17/659,084, Kouichirou Ochi, filed Apr. 13, 2022,
U.S. Appl. No. 17/664,102, Megumi Shino, filed May 19, 2022,

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle containing a binder resin and an inorganic fine particle, wherein the binder resin contains a crystalline resin, the crystalline resin has a first monomer unit represented by the following formula (1), the inorganic fine particle is at least one inorganic fine particle selected from the group consisting of a particle containing $CaCO_3$, a particle containing $BaSO_4$, a particle containing $Mg_3Si_4O_{10}(OH)_2$, and a particle containing $Al_2Si_2O_5(OH)_4$, the inorganic fine particle is treated with a fatty acid, and a content B of the inorganic fine particle in the toner particle is 1.0 mass % or more to 15.0 mass % or less, (1)

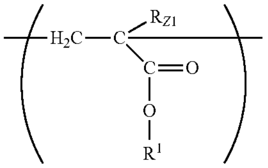

wherein $R_{Z1}$ represents a hydrogen atom or a methyl group, and $R^1$ represents an alkyl group having 18 to 36 carbon atoms.

12 Claims, No Drawings

(56) References Cited

U.S. PATENT DOCUMENTS

| | | | | |
|---|---|---|---|---|
| 10,969,705 | B2 | 4/2021 | Shirayama | |
| 11,029,617 | B2 | 6/2021 | Chimoto | |
| 11,061,344 | B2 * | 7/2021 | Sawada et al. | G03G 9/08 |
| 11,131,938 | B2 | 9/2021 | Murayama | |
| 11,131,939 | B2 | 9/2021 | Hama | |
| 11,181,848 | B2 | 11/2021 | Ochi | |
| 2003/0027073 | A1 * | 2/2003 | Serizawa et al. | G03G 9/087 430/124 |
| 2013/0108955 | A1 | 5/2013 | Shibata | |
| 2013/0288173 | A1 | 10/2013 | Hashimoto | |
| 2014/0329176 | A1 | 11/2014 | Kanno | |
| 2015/0099227 | A1 | 4/2015 | Ida | |
| 2015/0220011 | A1 | 8/2015 | Miyaake | |
| 2016/0091804 | A1 * | 3/2016 | Nukada et al. | G03G 15/00 |
| 2016/0109820 | A1 | 4/2016 | Hashimoto | |
| 2018/0314176 | A1 | 11/2018 | Ikeda | |
| 2019/0317419 | A1 * | 10/2019 | Nakajima | G03G 9/09 |
| 2021/0055668 | A1 | 2/2021 | Tamura | |
| 2021/0141315 | A1 | 5/2021 | Kamae | |
| 2021/0181647 | A1 | 6/2021 | Hashimoto | |
| 2021/0181649 | A1 * | 6/2021 | Kanno et al. | G03G 9/087 |
| 2021/0181650 | A1 | 6/2021 | Hama | |
| 2021/0181651 | A1 | 6/2021 | Kanno | |
| 2021/0278774 | A1 | 9/2021 | Hashimoto | |
| 2021/0278775 | A1 | 9/2021 | Kamae | |
| 2021/0302853 | A1 | 9/2021 | Murata | |
| 2021/0302854 | A1 | 9/2021 | Kitamura | |
| 2021/0389688 | A1 | 12/2021 | Shibata | |
| 2022/0050398 | A1 | 2/2022 | Ooyama | |
| 2022/0187728 | A1 | 6/2022 | Miura | |
| 2022/0197163 | A1 | 6/2022 | Kajihara | |
| 2022/0197166 | A1 | 6/2022 | Chimoto | |
| 2022/0197174 | A1 | 6/2022 | Kajihara | |
| 2022/0236654 | A1 | 7/2022 | Kanno | |
| 2022/0236655 | A1 | 7/2022 | Kanno | |
| 2022/0236656 | A1 | 7/2022 | Kanno | |

* cited by examiner

TONER

BACKGROUND OF THE INVENTION

Field of the Invention

The present disclosure relates to a toner for use in an image formation method of an electrophotographic system.

Description of the Related Art

In recent years, full-color copying machines of electrophotographic systems have been widespread, and started being applied to the printing market as well. In the printing market, there is a growing demand for a reduction in running costs in addition to high speed, high image quality, and high productivity while supporting a wide variety of media (paper types) including heavy paper and coated paper. As an energy conservation measure, in order to reduce the power consumption in the fusing step, a technique of fusing a toner at a lower temperature has been studied.

It is known that a toner containing a crystalline resin having sharp melting properties as a main component of a binder resin of the toner has an excellent low-temperature fusibility as compared with a toner containing an amorphous resin as a main component. For example, Japanese Patent Application Laid-Open No. 2014-66994 studies the low-temperature fusibility, the heat-resistant preservability, and the saturation of an image, for a toner having a sea-island structure (matrix-domain structure) in which a crystalline region containing a crystalline resin is formed as a sea and an amorphous region containing a colorant is formed as an island.

SUMMARY OF THE INVENTION

In a toner that contains a crystalline resin and is excellent in low-temperature fusibility as described in Japanese Patent Application Laid-Open No. 2014-66994, particularly when a crystalline resin that has a relatively low strength at around room temperature is used, a problem sometimes occurs in terms of scratch resistance in a fused image formed on media containing a large number of inorganic fine particles such as heavy paper and coated paper.

In view of this, an object of the present disclosure is to provide a toner that has a favorable low-temperature fusibility and is excellent in scratch resistance of an image even in high-speed printing.

The present disclosure relates to a toner comprising a toner particle containing a binder resin and an inorganic fine particle, wherein the binder resin contains a crystalline resin, the crystalline resin has a first monomer unit represented by the following formula (1), the inorganic fine particle is at least one inorganic fine particle selected from the group consisting of (i) a particle containing $CaCO_3$, (ii) a particle containing $BaSO_4$, (iii) a particle containing $Mg_3Si_4O_{10}(OH)_2$, and (iv) a particle containing $Al_2Si_2O_5(OH)_4$, the inorganic fine particle is treated with a fatty acid, and a content B of the inorganic fine particle in the toner particle is 1.0% by mass or more to 15.0% by mass or less,

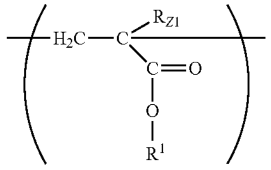

(1)

wherein $R_{Z1}$ represents a hydrogen atom or a methyl group, and $R^1$ represents an alkyl group having 18 to 36 carbon atoms.

Further features of the present invention will become apparent from the following description of exemplary embodiments.

DESCRIPTION OF THE EMBODIMENTS

In the present disclosure, the description “XX or more to YY or less”, “XX to YY”, or the like which represents a numerical value range means a numerical value range including the lower limit and the upper limit which are end points unless otherwise noted.

In the case where numerical value ranges are described stepwise, the upper limits and the lower limits of the respective numerical value ranges can be combined as desired.

A toner (toner particle) of the present disclosure contains a binder resin (a crystalline resin as the binder resin) and inorganic fine particles. Hereinafter, each component will be described.

<Binder Resin>

As the binder resin contained in the toner particles, publicly-known polymers can be used, and specifically, the following polymers can be used.

Such polymers include homopolymers of styrene and substitution products thereof such as polystyrene, poly-p-chlorostyrene, and polyvinyl toluene; styrene-based copolymers such as a styrene-p-chlorostyrene copolymer, a styrene-vinyl toluene copolymer, a styrene-vinyl naphthalene copolymer, a styrene-acrylic acid ester copolymer, a styrene-methacrylic acid ester copolymer, a styrene-α-methyl chloromethacrylate copolymer, a styrene-acrylonitrile copolymer, a styrene-vinyl methyl ether copolymer, a styrene-vinyl ethyl ether copolymer, a styrene-vinyl methyl ketone copolymer, and a styrene-acrylonitrile-indene copolymer; polyvinyl chloride, a phenolic resin, a natural resin-modified phenol resin, a natural resin-modified maleic acid resin, an acrylic resin, a methacrylic resin, polyvinyl acetate, a silicone resin, a polyester resin, a polyurethane resin, a polyamide resin, a furan resin, an epoxy resin, a xylene resin, a polyvinyl butyral, a terpene resin, a coumarone-indene resin, a petroleum-based resin, and the like. One of these resins may be used alone, or two or more of these may be used in combination.

The binder resin preferably has an ester group. When the binder resin has an ester group, the affinity between the binder resin and the polar portions of the inorganic fine particles is improved, which improves the filler effect per inorganic fine particle. This improves the hot-offset resistance of the toner. Specific examples of preferable binder resins having an ester group include a styrene-acrylic acid ester copolymer and a polyester resin.

<Crystalline Resin>

In the present disclosure, it is necessary to contain a crystalline resin having a first monomer unit represented by the following formula (1) as the binder resin contained in the toner particles:

(1)

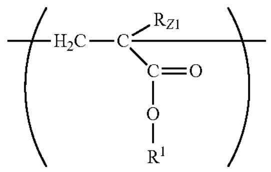

wherein $R_{Z1}$ represents a hydrogen atom or a methyl group, and $R^1$ represents an alkyl group having 18 to 36 carbon atoms.

The crystalline resin containing the first monomer unit represented by the formula (1) has a relatively low strength at around room temperature, and in the case where image formation is conducted using a toner containing such a crystalline resin, there is a case where the scratch resistance of the image is insufficient. A technique that causes toner particles to contain inorganic fine particles to improve the mechanical strength of the toner particles is also known. However, in the case where the affinity between a resin and inorganic fine particles is low, these are likely to separate at their interstices, so that a sufficient improvement in scratch resistance of an image cannot be obtained.

In view of this, as a result of conducting earnest studies, the present inventors have found that the above-described problem can be solved by causing toner particles that contain a crystalline resin containing the first monomer unit represented by the formula (1) to contain a specific amount of specific inorganic fine particles surface-treated with a fatty acid.

Although the mechanism that solves the above-described problem in the toner according to the present disclosure is not clear, the present inventors surmise the reason as described below.

The reason can be considered as follows: when toner particles that contain a crystalline resin containing the first monomer unit represented by the formula (1) are caused to contain inorganic fine particles treated with a fatty acid, alkyl groups which the fatty acid of the surface-treatment agent has and alkyl groups ($R^1$ portion) of the (meth)acrylic acid ester unit represented by the formula (1) exhibit a high affinity, which causes the inorganic fine particles and the crystalline resin to firmly bond via the fatty acid, so that the strength of the entire toner particles is enhanced. As a result, the scratch resistance of an image is improved. In addition, since the alkyl groups of the fatty acid used to surface-treat the inorganic fine particles enhance the crystallization of the crystalline resin, the improving effect can be obtained in terms of low-temperature fusibility as well.

In the crystalline resin, the content X of the first monomer unit is preferably 30% by mass or more. When the content X is less than 30%, the crystallinity in the crystalline resin decreases, so that sufficient sharp melting properties cannot be obtained and an excellent low-temperature fusibility becomes unlikely to be obtained.

In addition, the content of the crystalline resin is preferably 40% by mass or more of the entire binder resin. When the content of the crystalline resin is 40% by mass or more, a sufficient sharp melting properties can be obtained and a more excellent low-temperature fusibility becomes likely to be obtained.

Moreover, the crystalline resin preferably contains a monomer unit having any of a nitrile group, a carboxy group, and a hydroxy group. When the crystalline resin has these polar groups, interaction between the crystalline resin and the inorganic fine particle base or carboxy groups which the fatty acid has is enhanced, so that a more significant effect is achieved. In addition, the crystalline resin preferably has a monomer unit having these polar groups in an amount of 5% by mass or more to 50% by mass or less from the viewpoint of improvements in both scratch resistance and low-temperature fusibility.

Note that in the present disclosure, as the crystalline resin, publicly-known crystalline resins can be used. The publicly-known crystalline resins include, for example, crystalline polyester, a crystalline vinyl resin, crystalline polyurethane, and crystalline polyurea. In addition, the publicly-known crystalline resins also include ethylene copolymers such as an ethylene-vinyl acetate copolymer, an ethylene-methyl acrylate copolymer, an ethylene-ethyl acrylate copolymer, an ethylene-butyl acrylate copolymer, an ethylene-methyl methacrylate copolymer, an ethylene-methacrylic acid copolymer, and an ethylene-acrylic acid copolymer, and the like.

<Inorganic Fine Particle (Internal Addition)>

The inorganic fine particle contained in the toner particles is at least one inorganic fine particle selected from the group consisting of a particle containing $CaCO_3$, a particle containing $BaSO_4$, a particle containing $Mg_3Si_4O_{10}(OH)$ 2, and a particle containing $Al_2Si_2O_5(OH)$ 4, and the fine particle is a fine particle treated with a fatty acid.

$Mg_3Si_4O_{10}(OH)$ 2 is a hydrated magnesium silicate. Examples of particles containing $Mg_3Si_4O_{10}(OH)$ 2 include talc particles. $Al_2Si_2O_5(OH)$ 4 is a hydrated aluminum silicate. Examples of particles containing $Al_2Si_2O_5(OH)$ 4 include kaolin particles and clay particles.

The inorganic fine particles are preferably $CaCO_3$ particles. Since lubricating action due to removal from a domain acts appropriately on $CaCO_3$ particles, the effect to further improve the scratch resistance can be expected.

The method for producing calcium carbonate includes a carbon dioxide gas method, a lime soda method, a soda method, a pulverizing method, and the like.

The calcium carbonate particles preferably have a spindle shape. This makes it easy to obtain calcium carbonate having an appropriate specific surface area, which strengthen interaction between alkyl groups which the fatty acid on the surfaces of the calcium carbonate particles has and alkyl groups which the (meth)acrylic acid ester unit in the crystalline resin has, improving the strength as the entire toner particles and making it easy to obtain the effect to improve the scratch resistance.

In addition, it is preferable that in an X-ray diffraction measurement using a CuKα ray on the toner particles, when the Bragg angle is represented by θ, the calcium carbonate particles have peaks within a range of 2θ=26.5°±0.5° and within a range of 2θ=29.5°±0.5°, and (i) a crystallite diameter of a crystal to which the peak within 2θ=29.5°±0.5° is attributed be 10 nm or more to 45 nm or less, and (ii) a ratio between a peak intensity within 2θ=26.5°±0.5° and a peak intensity within 2θ=29.5°±0.5° be 0.15 or more to 0.24 or less.

It is considered that when the crystallite diameter is within this range, the interaction between steps of the (104) plane of the calcium carbonate and the binder resin becomes appropriate, leading to an improvement in scratch resistance. Note that the method for measuring an X-ray diffraction will be described later.

When the content B of the inorganic fine particles in the toner particles is 1.0 mass % or more to 15.0 mass % or less, the effect to improve the scratch resistance of an image can be obtained. When the content of the inorganic fine particles is too small, the number of portions in which the alkyl groups of the fatty acid on the surfaces of the inorganic fine particles and the alkyl groups of the acrylic acid react is small, so that the effect to improve the strength as the entire toner particles cannot be sufficiently obtained. When the content of the inorganic fine particles is too large, the toner particles become brittle, so that the effect to improve the scratch resistance cannot be sufficiently obtained.

In addition, when the number-average particle diameter of the primary particle of the inorganic fine particle is represented by Dc, Dc is preferably 100 nm or more to 500 nm or less. When Dc is within the above range, the bonding effect based on a high affinity between the alkyl groups which the fatty acid on the surfaces of the inorganic fine particles has and the alkyl groups of the (meth)acrylic acid of the acrylic acid ester unit in the crystalline resin becomes appropriate, so that the strength of the entire toner particles is improved, making it easier to obtain the effect to improve the scratch resistance.

In addition, when a BET specific surface area of the inorganic fine particle is represented by D, D is preferably 4.5 $m^2/g$ or more to 25.0 $m^2/g$ or less. When D is within the above range, the bonding effect based on a high affinity between the alkyl groups which the fatty acid on the surfaces of the inorganic fine particles has and the alkyl groups of the (meth)acrylic acid of the acrylic acid ester unit in the crystalline resin becomes appropriate, so that the strength of the entire toner particles is enhanced, making it possible to obtain the effect to improve the scratch resistance.

The number of carbon atoms of the fatty acid is preferably 12 to 18 from the viewpoint of the low-temperature fusibility. When the number of carbon atoms is too large, the melting point becomes high, while when the number of carbon atoms is too small, the crystallinity cannot be sufficiently obtained, making it difficult to obtain the sharp melting properties.

In addition, the difference between the number of carbon atoms of the fatty acid used to surface-treat the inorganic fine particle and the number of carbon atoms of $R^1$ contained in the first monomer unit is preferably 5 or less. When the difference is 5 or less, the affinity between the alkyl groups of the fatty acid on the surfaces of the inorganic fine particles and the acrylic acid in the crystalline resin becomes sufficiently high, so that the bonding strength is further enhanced, making the effect to improve the scratch resistance significant.

An amount C of the fatty acid which the inorganic fine particle has is preferably 0.1 or more to 5.0 mass % or less based on the mass of the inorganic fine particle. When the treatment amount is within the above range, the bonding effect acting between the alkyl groups which the fatty acid on the surfaces of the inorganic fine particles has and the alkyl groups which the (meth)acrylic acid ester unit in the crystalline resin has becomes sufficient.

It is preferable that when a content of the first monomer unit represented by the formula (1) in the toner particle is represented by A (mass %), a content of the inorganic fine particle in the toner particle is represented by B (mass %), and an amount of the fatty acid which the inorganic fine particle has is represented by C (mass %), the A to the C satisfy a relation $0.0001 \le B \times C/(100 \times A) \le 0.0100 \le$. When the value of $B \times C/(100 \times A)$ is within the above range, the ratio of presence between the alkyl groups which the fatty acid on the surfaces of the inorganic fine particles has and the alkyl groups which the (meth)acrylic acid ester unit in the crystalline resin has becomes appropriate, so that the strength of the entire toner particles is improved, making it possible to obtain the effect to improve the scratch resistance.

It is preferable that when an amount of the fatty acid which the inorganic fine particle have is represented by C (mass %), and a BET specific surface area of the inorganic fine particle is represented by D ($m^2/g$), the C and the D satisfy a relation $0.015 \le C/D \le 0.500$. When the value of C/D is within the above range, the coverage by the fatty acid on the surfaces of the inorganic fine particles becomes appropriate, so that the strength of the entire toner particles is improved, making it possible to obtain the effect to improve the scratch resistance.

<Colorant>

The toner particles may further contain a colorant as necessary. As the colorant, a pigment may be used alone, or a dye and a pigment may be used in combination. It is preferable to use a dye and a pigment in combination from the viewpoint of the image quality of a full-color image. Specifically, the colorant includes the following.

The black colorant include carbon black; and what is toned to black using a yellow colorant, a magenta colorant, and a cyan colorant.

Pigments for magenta toners include the following: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Vat Red 1, 2, 10, 13, 15, 23, 29, and 35.

Dyes for magenta toners include the following: oil-soluble dyes such as C.I. Solvent Red 1, 3, 8, 23, 24, 25, 27, 30, 49, 81, 82, 83, 84, 100, 109, and 121; C.I. Disperse Red 9; C.I. Solvent Violet 8, 13, 14, 21, and 27; and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39, and 40; and C.I. Basic Violet 1, 3, 7, 10, 14, 15, 21, 25, 26, 27, and 28.

Pigments for cyan toners include the following: C.I. Pigment Blue 2, 3, 15:2, 15:3, 15:4, 16, and 17; C.I. Vat Blue 6; C.I. Acid Blue 45, and copper phthalocyanine pigments in which 1 to 5 phthalimidomethyl groups are substituted in a phthalocyanine skeleton.

Dyes for cyan toners include C.I. Solvent Blue 70.

Pigments for yellow toners include the following: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellow 1, 3, and 20.

Dyes for yellow toners include C.I. Solvent Yellow 162.

These colorants may be used alone or in a mixture, or further in the state of a solid solution. The colorant may be selected from the viewpoints of hue angle, saturation, intensity, lightfastness, OHP transparency, and dispersibility into a toner.

The content ratio Mp (mass %) of the colorant in the toner particles is preferably 0.5 mass % or more to 20.0 mass % or less, and more preferably 1.0 mass % or more to 10.0 mass % or less, relative to the toner particles.

<Release Agent (Wax)>

The toner particles may contain a release agent as necessary. When the toner particles contain a release agent, it is possible to suppress an occurrence of hot offset at the time of heating and fusing the toner.

The release agent is exemplified by low-molecular-weight polyolefins, silicone wax, fatty acid amides, ester waxes, carnauba wax, hydrocarbon-based waxes, and the like in general.

<Inorganic Fine Particles for External Addition>

The toner of the present disclosure may contain an external additive. For example, a toner may be obtained by externally adding an external additive to the toner particles. The external additive is preferably inorganic fine particles such as silica fine particles, titanium oxide fine particles, and aluminum oxide fine particles.

Subsequently, a method for producing a toner, for producing the toner according to the present disclosure will be described. The method for producing the toner of the present disclosure is not particularly limited, and a publicly-known method such as a pulverizing method, a suspension polymerization method, a dissolution suspension method, an emulsification aggregation method, or a dispersion polymerization method can be used.

Hereinafter, a procedure for producing the toner in accordance with the pulverizing method will be described.

<Raw Material Mixing Step>

In a raw material mixing step, the binder resin, the inorganic fine particles, a wax, a colorant, and other components such as a charge control agent as necessary, for example, are weighed in predetermined amounts, blended, and mixed, as materials forming the toner particles. Examples of the mixing apparatus include a double cone mixer, a V-type mixer, a drum-type mixer, a super mixer, a Henschel mixer, a Nauta mixer, Mechano Hybrid (manufactured by Nippon Coke & Engineering Co., Ltd.), and the like.

<Melting and Kneading Step>

Next, the materials thus mixed are melted and kneaded to disperse the inorganic fine particles, the wax, and the like into the binder resin. In the melting and kneading step, a batch-type kneader such as a pressure kneader or a Banbury mixer, or a continuous kneader can be used, and a single-screw or twin-screw extruder is mainly used because of their advantages of continuous manufacturing. The single-screw or twin-screw extruders include, for example, a KTK-type twin-screw extruder (manufactured by Kobe Steel, Ltd.), a TEM-type twin-screw extruder (manufactured by Toshiba Machine Co., Ltd.), a PCM kneader (manufactured by Ikegai Corporation), a twin-screw extruder (manufactured by K.C.K. Corporation), a co-kneader (manufactured by Buss AG), KNEADEX (manufactured by Nippon Coke & Engineering Co., Ltd.), and the like. Furthermore, a resin composition obtained by the melting and kneading may be rolled by a twin roll or the like, and cooled by water or the like in a cooling step.

It is possible to control the dispersed states of the inorganic fine particles and the wax, and the like by controlling the kneading temperature, the rotation speed of the screw, and the like in the melting and kneading step.

<Pulverizing Step>

Then, the cooled product of the resin composition is pulverized to have a desired particle diameter in a pulverizing step. In the pulverizing step, the cooled product is coarsely pulverized by, for example, a pulverizer such as a crusher, a hammer mill or a feather mill, and is then further finely pulverized by, for example, Kryptron System (manufactured by Kawasaki Heavy Industries, Ltd.), Super Rotor (manufactured by Nisshin Engineering Inc.), Turbo Mill (manufactured by Turbo Kogyo Co., Ltd.), or a fine pulverizer of an air jet system.

<Classifying Step>

Thereafter, classification is performed as necessary using a classifier or a sieving machine such as Elbow-Jet (manufactured by Nittetsu Mining Co., Ltd.) of an inertial classification system, Turboplex (manufactured by Hosokawa Micron Corporation) of a centrifugal classification system, TSP separator (manufactured by Hosokawa Micron Corporation), or Faculty (manufactured by Hosokawa Micron Corporation).

<Surface-Treating Step>

Thereafter, it is also preferable to surface-treat the toner particles with heating. For example, the surface-treatment can also be conduct with hot air using a surface-treatment apparatus.

<Externally Adding Step>

Furthermore, an external additive is externally added to the surfaces of the toner particles as necessary. The method for externally adding an external additive includes a method that weighs the classified toner and various types of publicly-known external additives in predetermined amounts, followed by agitating and mixing using a mixing apparatus such as a double cone mixer, a V-type mixer, a drum-type mixer, a super mixer, a Henschel mixer, a Nauta mixer, Mechano Hybrid (manufactured by Nippon Coke & Engineering Co., Ltd.), or Nobilta (manufactured by Hosokawa Micron Corporation) as an external addition machine.

Here, the following step A is preferably included as preparation of raw materials used in the above raw material mixing step. Although the following description is about the case where the inorganic fine particles (internal addition) are of calcium carbonate, the following step A can be included also in the case of other inorganic fine particles (internal addition) as described above.

<Step A>

The step A is a step of increasing steps (active planes) of the (104) plane of calcium carbonate.

In the raw material mixing step, the binder resin, calcium carbonate, the colorant particles, and the like are weighed in predetermined amounts, blended, and mixed. The mixing apparatus is not particularly limited, but includes a Henschel mixer (manufactured by Nippon Coke & Engineering Co., Ltd.); a super mixer (manufactured by Kawata Mfg Co., Ltd.); Ribocone (manufactured by Okawara Mfg. Co., Ltd.); Nauta mixer, Turbulizer, Cyclomix (manufactured by Hosokawa Micron Corporation); Spiral Pin Mixer (manufactured by Pacific Machinery & Engineering Co., Ltd.); Lodige Mixer (manufactured by Matsubo Corporation), and the like. A mixture mixed using this mixing apparatus is referred to as a mixture 1.

Next, the mixture 1 is melt and kneaded using a twin-screw extruder. At this time, it is possible to reduce the (104) planes of the calcium carbonate particles and increase the steps by rubbing the calcium carbonate particles each other, or rubbing the calcium carbonate particles and another material such as colorant particles each other, for example. In addition, further increasing steps requires a high shear force. For this, the step A is preferably conducted in a state of high viscosity. Then, interaction is expressed between the steps and the binder resin. Here, a melted and kneaded product produced in the step A is defined as a "calcium carbonate particle dispersion".

When the content of the binder resin is represented by Mr (mass %) and the content of the calcium carbonate particles is represented by Mi (mass %) based on the mass of the mixture 1 in the step A, it is preferable to satisfy:

$15 \leq Mr \leq 75$, and $0.17 \leq Mi/Mr \leq 1.3$.

This is because when the contents are within the above ranges, it is possible to reduce the (104) planes of the calcium carbonate particles and increase the steps (active plane) by rubbing the calcium carbonate particles each other, or rubbing the calcium carbonate particles and pigment particles each other.

The melting and kneading apparatus is not particularly limited, but includes a batch-type kneader such as a pressure kneader or a Banbury mixer, a TEM-type twin-screw extruder (manufactured by Toshiba Machine Co., Ltd.); a TEX twin-screw kneader (manufactured by The Japan Steel Works, Ltd.); a PCM kneader (manufactured by Ikegai Corporation); KNEADEX (manufactured by Mitsui Mining Co., Ltd.), and the like. A continuous kneader such as a single-screw or twin-screw extruder is preferable to a batch-type kneader because of their advantages of continuous manufacturing and the like. In addition, the peripheral speed of the screw is desirably 78 mm/s or more. The peripheral speed is defined as a distance by which one point on the outer peripheral portion of a screw of an extruder moves for one second. The peripheral speed is obtained from the diameter of the screw (mm)×the number pi×the rotation speed (rpm)/60. When the peripheral speed is within the above range, it is possible to reduce the (104) planes of the calcium carbonate particles and increase the steps (active planes).

The calcium carbonate particle dispersion obtained by melting and kneading is rolled with a twin roll or the like after the melting and kneading, and is then cooled down through a cooling step where the calcium carbonate particle dispersion is cooled by water cooling or the like.

Subsequently, the cooled product of the calcium carbonate particle dispersion obtained in the above steps is pulverized to have a particle diameter in a pulverizing step. In the pulverizing step, first, the cooled product is coarsely pulverized by a crusher, a hammer mill, a feather mill, or the like, and is further finely pulverized by Kryptron System (manufactured by Kawasaki Heavy Industries, Ltd.), Super Rotor (manufactured by Nisshin Engineering Inc.), or the like to obtain calcium carbonate particle dispersion fine particles. The calcium carbonate particle dispersion fine particles are referred to as a mixture 2, which is added to raw materials used in a raw material mixing step, so that a toner can be fabricated.

Hereinafter, methods for measuring the respective physical properties related to the present disclosure will be described.

<Method for Separating Each Material from Toner>

It is possible to separate each material from the toner by utilizing a difference in solubility among the materials contained in the toner into solvents.

First separation: The toner is dissolved into methyl ethyl ketone (MEK) having a temperature of 23° C. to separate a soluble (the second resin (for example, an amorphous resin)) and insolubles (the first resin (for example, a crystalline resin), the release agent, the colorant, the inorganic fine particles, and the like).

Second separation: The insolubles (the first resin, the release agent, the colorant, the inorganic fine particles, and the like) obtained in the first separation are dissolved into MEK having a temperature of at 100° C. to separate solubles (the first resin and the release agent) and insolubles (the colorant, the inorganic fine particles, and the like).

Third separation: The solubles (the first resin and the release agent) obtained in the second separation are dissolved into chloroform having a temperature of 23° C. to separate a soluble (the first resin) and an insoluble (the release agent).

Fourth separation: The insoluble obtained in the second separation is dispersed into tetrahydrofuran, and by changing a centrifugal force in a centrifugation method, calcium carbonate and the colorant are separated in accordance with a difference in specific gravity.

(The Case where a Third Resin is Contained in Addition to the First Resin and the Second Resin)

First separation: The toner is dissolved into methyl ethyl ketone (MEK) having a temperature of 23° C. to separate solubles (the second resin and the third resin) and insolubles (the first resin, the release agent, the colorant, the inorganic fine particles, and the like).

Second separation: The solubles (the second resin and the third resin) obtained in the first separation are dissolved into toluene having a temperature of 23° C. to separate a soluble (the third resin) and an insoluble (the second resin).

Third separation: The insolubles (the first resin, the release agent, the colorant, the inorganic fine particles, and the like) obtained in the first separation are dissolved into MEK having a temperature of 100° C. to separate solubles (the first resin and the release agent) and insolubles (the colorant, the inorganic fine particles, and the like).

Fourth separation: The solubles (the first resin and the release agent) obtained in the third separation are dissolved into chloroform having a temperature of 23° C. to separate a soluble (the first resin) and an insoluble (the release agent).

Fifth separation: The insolubles obtained in the third separation are dispersed into tetrahydrofuran, and by changing a centrifugal force in a centrifugation method, the inorganic fine particles and the colorant are separated in accordance with a difference in specific gravity.

<Content of Inorganic Fine Particles>

The content of the inorganic fine particles is calculated from the amount of the inorganic fine particles separated from the toner particles in the above-described methods.

<Particle Diameter of Inorganic Fine Particles>

The number-average particle diameter of the inorganic fine particles is calculated by observing the cross-sections of the toner particles using a scanning electron microscope (S-4800, Hitachi High Technologies Corporation), measuring major radii of 100 particles, and obtaining an average value.

<Structural Analysis of Surface-Treated Material of Inorganic Fine Particles>

The structure was analyzed using a pyrolysis-gas chromatography-mass spectrometry apparatus (GC•MS) as follows: 300 μg of calcium carbonate which was separated from the toner particles in the above-described method was embedded in Pyrofoil F590 described below and introduced into a pyrolysis furnace, followed by heating at 590° C. for 5 seconds in an inert (helium) atmosphere. A decomposition gas thus generated was introduced into an injection port for gas chromatography, and an oven profile described below was conducted. The column outlet was coupled to the MS apparatus by means of a transfer line, and a total ion chromatogram (TIC) was obtained in which the ion current was plotted on the vertical axis while the retention time was plotted on the horizontal axis. Subsequently, a mass spectrum was extracted using the attached software for all the detected peaks in the obtained chromatogram, the compounds were associated based on NIST-2017 database.

Measuring apparatuses and measurement conditions are as described below.

Pyrolysis furnace: Japan Analytical Industry Co., Ltd. JSP900 (manufactured by Japan Analytical Industry Co., Ltd.)

Pyrofoil: F590 (manufactured by Japan Analytical Industry Co., Ltd.)

GC: Agilent Technologies 7890A GC

MS: Agilent Technologies 5975C

Column: HP-5 ms 30 m, having an inner diameter of 0.25 mm and a thickness of mobile phase of 0.25 μm (manufactured by Agilent)

Carrier gas: He (having a purity of 99.9995% or more)

Oven profile: (1) held at a temperature of 40° C. for 3 min, (2) increased the temperature to 320° C. at 10° C./min, (3) held at a temperature of 320° C. for 20 min Injection port temperature: 280° C.

Split rate: 50:1

Column flow rate: 1 mL/min (fixed rate)

Transfer line temperature: 280° C.

Observed MS range: 30-600 Da

Ionization: EI 70 eV

Ion source temperature: 280° C.

Quadrupole temperature: 150° C.

<Amount of Surface-Treated Material of Inorganic Fine Particles>

The inorganic fine particles separated from the toner particles in the above-described method were measured using a thermogravimeter-differential thermal analyzer (manufactured by Rigaku corporation, differential thermal balance TG-DTA, ThermoPlusTG8120), the temperature was increased from 25° C. to 400° C. at a speed of 10° C./min, and the amount of the surface-treatment agent was measured from a change in weight.

EXAMPLES

Although the fundamental configurations and features of the present disclosure have been described above, the present disclosure will be specifically described based on Examples below. However, the present disclosure is not limited to these at all. Note that part is based on mass unless otherwise noted.

<Inorganic Fine Particles>

Inorganic fine particles having different materials, particle diameters, shapes, surface-treatment amounts were prepared as described in Table 1, and were provided to production of toner particles described later. In Table 1, the numbers of carbon atoms and names of surface-treatment fatty acids are as follows.

18 Carbon atoms: Stearic acid

12 Carbon atoms: Lauric acid

TABLE 1

| Inorganic fine particle No. | Material | Number-average particle diameter (nm) | BET specific surface area of the inorganic fine particle ($m^2/g$) | The number of carbon atoms of the fatty acid for surface-treatment | The amount C of the fatty acid which the inorganic fine particle has (mass %) | Shape |
|---|---|---|---|---|---|---|
| Inorganic fine particle 1 | $CaCO_3$ | 400 | 11.4 | 18 | 1.0 | Spindle shape |
| Inorganic fine particle 2 | $BaSO_4$ | 400 | 6.7 | 18 | 1.0 | Indefinite shape |
| Inorganic fine particle 3 | $Mg_3Si_4O_{10}(OH)_2$ | 400 | 19.0 | 18 | 1.0 | Plate shape |
| Inorganic fine particle 4 | $Al_2Si_2O_5(OH)_4$ | 400 | 20.0 | 18 | 1.0 | Plate shape |
| Inorganic fine particle 5 | $CaCO_3$ | 105 | 24.0 | 18 | 1.0 | Spindle shape |
| Inorganic fine particle 6 | $CaCO_3$ | 400 | 11.3 | 12 | 1.0 | Spindle shape |
| Inorganic fine particle 7 | $CaCO_3$ | 400 | 11.6 | 18 | 0.5 | Spindle shape |
| Inorganic fine particle 8 | $CaCO_3$ | 400 | 10.9 | 18 | 4.0 | Spindle shape |
| Inorganic fine particle 9 | $CaCO_3$ | 400 | 5.1 | 18 | 1.0 | Cubic shape |
| Inorganic fine particle 10 | $CaCO_3$ | 400 | 4.7 | 18 | 5.0 | Cubic shape |
| Inorganic fine particle 11 | $CaCO_3$ | 400 | 5.5 | 18 | 0.1 | Cubic shape |
| Inorganic fine particle 12 | $CaCO_3$ | 900 | 3.6 | 18 | 1.0 | Cubic shape |
| Inorganic fine particle 13 | $CaCO_3$ | 1000 | 3.4 | 18 | 0.1 | Cubic shape |
| Inorganic fine particle 14 | $CaCO_3$ | 1000 | 3.5 | 18 | 0.03 | Cubic shape |

<Example of Production of Crystalline Resin C-1>

| | |
|---|---|
| Solvent: Toluene | 100.0 parts |
| Monomer composition | 100.0 parts |
| (The monomer composition was obtained by mixing behenyl acrylate, acrylonitrile, acrylic acid, and styrene described below in ratio described below. | |
| Behenyl acrylate: | 60.0 parts |
| Acrylonitrile: | 13.0 parts |
| Acrylic acid: | 2.0 parts |
| Styrene: | 25.0 parts) |
| Polymerization initiator | 0.5 parts |

-continued

| |
|---|
| [t-butyl peroxypivalate (manufactured by NOF CORPORATION: Perbutyl PV)] |

The above-described materials were loaded into a reaction vessel including a reflux cooling tube, an agitator, a thermometer, and a nitrogen introduction tube under a nitrogen atmosphere. The inside of the reaction vessel was heated to 70° C. while being agitated at 200 rpm to conduct a polymerization reaction for 12 hours, thereby obtaining a solution in which the polymer of the monomer composition was dissolved in toluene.

Subsequently, the solution was cooled down to 25° C., and thereafter, the solution was loaded into 1000.0 parts of methanol while being agitated to precipitate a methanol insoluble. The methanol insoluble thus obtained was separated by filtration, further washed with methanol, and thereafter, vacuum drying was conducted at 40° C. for 24 hours to obtain a crystalline resin C-1.

<Example of Production of Crystalline Resins C-2 and C-3>

Crystalline resins C-2 and C-3 were obtained in the same method as in the example of production of the crystalline resin C-1 except that the monomers and parts by mass were changed as in Table 2.

TABLE 2

| | First monomer | | Second monomer | | Third monomer | | Fourth monomer | |
|---|---|---|---|---|---|---|---|---|
| Crystalline resin C | Type | Parts | Type | Parts | Type | Parts | Type | Parts |
| C-1 | BEA (C22) | 60.0 | AN | 13.0 | AA | 2.0 | St | 25.0 |
| C-2 | SA (Cl 8) | 60.0 | AN | 13.0 | AA | 2.0 | St | 25.0 |
| C-3 | MYA (C30) | 60.0 | AN | 1.0 | AA | 2.0 | St | 37.0 |

Abbreviations in Table 2 are as follows:
BEA: behenyl acrylate ($R^1$ in the formula (1) had 22 carbon atoms)
SA: stearyl acrylate ($R^1$ in the formula (1) had 18 carbon atoms)
MYA: myricyl acrylate ($R^1$ in the formula (l) had 30 carbon atoms)
AN: acrylonitrile
AA: acrylic acid
St: styrene.

<Example of Production of Crystalline Resin C-4>

1,10-Decanediol: 46.9 parts (0.27 mol parts; 100.0 mol % relative to the total number of moles of the polyol)

Sebacic acid: 53.1 parts (0.26 mol parts; 100.0 mol % relative to the total number of moles of the polyvalent carboxylic acid)

The above materials were weighed into a reaction tank equipped with a cooling tube, an agitator, a nitrogen introduction tube, and a thermocouple. Next, the inside of the flask was replaced with nitrogen gas, and thereafter, the temperature was gradually increased while agitating, followed by reacting for 3 hours at a temperature of 140° C. while agitating.

Tin 2-ethylhexanoate: 0.5 parts

Thereafter, the above material was added, and the pressure inside the reaction tank was reduced to 8.3 kPa, followed by reacting for 4 hours while the temperature was maintained at 200° C. to obtain a crystalline resin C-4, which was a crystalline polyester resin.

<Example of Production of Amorphous Resin A-1>

An autoclave was charged with 50.0 parts of xylene, and after replacement with nitrogen, the temperature was increased to 185° C. in a sealed state under agitation.

To the autoclave, 75.0 parts of styrene, 15.5 parts of n-butyl acrylate, 1.1 parts of divinylbenzene, 9.5 parts of acrylonitrile, and 0.5 parts of acrylic acid, as well as a mixed solution of 1.5 parts of di-tert-butyl peroxide and 20.0 parts of xylene was dropped continuously for 3 hours be polymerized while the temperature in the autoclave was controlled at 185° C.

Furthermore, the mixture was held for 1 hour at the same temperature to complete the polymerization, and the solvent was removed to obtain an amorphous resin A-1.

<Example of Production of Amorphous Resin A-2>

Polyoxypropylene(2.2)-2,2-bis(4-hydroxyphenyl)propane: 71.9 parts (0.20 mol; 100.0 mol % relative to the total number of moles of the polyol)

terephthalic acid: 26.8 parts (0.16 mol; 96.0 mol % relative to the total number of moles of the polyvalent carboxylic acid)

titanium tetrabutoxide: 0.5 parts

The above materials were weighed into a reaction tank equipped with a cooling tube, an agitator, a nitrogen introduction tube, and a thermocouple. Next, the inside of the flask was replaced with nitrogen gas, and thereafter, the temperature was gradually increased while agitating, followed by reacting for 4 hours at a temperature of 200° C. while agitating.

Furthermore, the pressure inside the reaction tank was reduced to 8.3 kPa, was maintained for 1 hour, and thereafter was returned to atmospheric pressure (a first reacting step).

Trimellitic anhydride: 1.3 parts (0.01 mol; 4.0 mol % relative to the total number of moles of the polyvalent carboxylic acid)

Thereafter, the above material was added, the pressure inside the reaction tank was reduced to 8.3 kPa, followed by reacting for 1 hour while the temperature was maintained at 180° C. (a second reacting step) to obtain an amorphous resin A-2, which is an amorphous polyester resin, having a weight-average molecular weight (Mw) of 5000.

<Example of Production of Inorganic Fine Particle Dispersion 1>

| | |
|---|---|
| Colorant (cyan pigment: Pigment Blue 15:3) | 6.0 parts |
| Inorganic fine particles 1 | 10.0 parts |
| Crystalline resin C-1 | 20.0 parts |

The above materials were mixed using a Henschel mixer (model FM-75, manufactured by Mitsui Mining Co., Ltd.) with a rotation speed of 20 $s^{-1}$ and a rotation time of 5 min, and thereafter were kneaded at 100° C. using a twin-screw kneader (model PCM-30, manufactured by Ikegai Corporation). The kneaded product thus obtained was cooled down, and coarsely pulverized to have a weight-average particle diameter of 100 μm or less in a pin mill to obtain a colorant-containing inorganic fine particle dispersion 1.

<Example of Production of Toner Particles 1>

| | |
|---|---|
| Crystalline resin C-1 | 28 parts |
| Amorphous resin A-1 | 32 parts |
| Inorganic fine particle dispersion 1 | 36 parts |
| Wax | 4 parts |
| (Fischer-Tropsch wax; a peak temperature of a maximum endothermic peak is 90° C.) | |

The materials were mixed using a Henschel mixer (model FM-75, manufactured by Nippon Coke & Engineering Co., Ltd.) with a rotation speed of 20 $s^{-1}$ and a rotation time of 5 min, and thereafter were kneaded at a screw rotation speed of 250 rpm and at a discharge temperature of 130° C. using a twin-screw kneader (model PCM-30, manufactured by Ikegai Corporation) in which the temperature was set to 130° C.

The kneaded mixture was coarsely pulverized to have 1 mm or less using a hammer mill to obtain a coarsely pulverized product. The coarsely pulverized product thus obtained was finely pulverized using a mechanical pulverizer (T-250, manufactured by FREUND-TURBO CORPORATION). Moreover, the finely pulverized product was classified using Faculty F-300 (manufactured by Hosokawa Micron Corporation) to obtain toner particles 1 having a weight-average particle diameter of about 6.0 μm. The classification operation conditions were such that the number of revolutions of the classification rotor was set to 130 $s^{-1}$ and the number of revolutions of the dispersion rotor was set to 120 $s^{-1}$.

<Example of Production of Toner Particles 2 to 42>

Toner particles 2 to 42 were obtained in the same manner as in the toner particles 1 except that inorganic fine particles and crystalline resins described in Table 3 were used. The component of each crystalline resin described in Table 3 is a value of the sum of the crystalline resin used for production of toner particles and the crystalline resin contained in the inorganic fine particle dispersion.

In the toner particles 9, 13, 24 to 35, and 37 to 41, (1) the content of the first monomer unit and (2) the content of a monomer unit having any of a nitrile group, a carboxy group, and a hydroxy group were set as described in Table 3 based on the monomer component of the crystalline resin C-1.

On the other hand, C-2 was used in place of the crystalline resin C-1 in the toner particles 8, C-3 was used in place of the crystalline resin C-1 in the toner particles 36, and crystalline resin C-4 was used in place of the crystalline resin C-1 and amorphous resin A-2 was used in place of the amorphous resin A-1 in the toner particles 42.

In addition, in the production of inorganic fine particle dispersion, dispersions containing inorganic fine particles having different crystallite diameters and peak intensity ratios were produced by adjusting the mixing ratio between the resin component and the calcium carbonate particles, the kneading temperature, and the kneading speed. As a result of using these, the "crystallite diameter of a crystal to which the peak within 2θ=29.5°±0.5° was attributed" and the "ratio between a peak intensity within 2θ=26.5°±0.5° and a peak intensity within 2θ=29.5°±0.5°" of the calcium carbonate particles in the toners were values described in Table 4.

Here, the toner particles 1 to 39 correspond respectively to Examples 1 to 39, and the toner particles 40 to 42 correspond respectively to Comparative Examples 1 to 3.

TABLE 3

| | Inorganic: fine particles | | | | Crystalline resin | | | | | |
|---|---|---|---|---|---|---|---|---|---|---|
| Toner Particle No. | No. | The amount C of the fatty acid which the inorganic fine particle has (mass %) | C/D | The difference between the number of carbon atoms of the fatty acid and the number of carbon atoms of $R^1$ | The number of carbon atoms of $R^1$ | The content of the monomer unit having any of a nitrile group, a carboxy group, a hydroxy group (mass %) | The content of the inorganic fine particle in the toner particle (mass %) | The content of the first monomer unit in the toner particle (mass %) | B · C/ 100 · A | The content of the crystalline resin having the first monomer unit in the binder resin (mass %) |
| 1 | 1 | 1.00 | 0.09 | 4 | 22 | 15 | 10 | 60 | 0.0035 | 60 |
| 2 | 2 | 1.00 | 0.15 | 4 | 22 | 15 | 10 | 60 | 0.0035 | 60 |
| 3 | 3 | 1.00 | 0.05 | 4 | 22 | 15 | 10 | 60 | 0.0035 | 60 |
| 4 | 4 | 1.00 | 0.05 | 4 | 22 | 15 | 10 | 60 | 0.0035 | 60 |
| 5 | 1 + 2 | 1.00 | 0.11 | 4 | 22 | 15 | 5 + 5 | 60 | 0.0035 | 60 |
| 6 | 1 | 1.00 | 0.09 | 4 | 22 | 15 | 1.1 | 60 | 0.0003 | 60 |
| 7 | 1 | 1.00 | 0.09 | 4 | 22 | 15 | 14.5 | 60 | 0.0053 | 60 |
| 8 | 1 | 1.00 | 0.09 | 0 | 18 | 15 | 10 | 60 | 0.0035 | 60 |
| 9 | 1 | 1.00 | 0.09 | 4 | 22 | 15 | 10 | 35 | 0.0060 | 60 |
| 10 | 5 | 1.00 | 0.04 | 4 | 22 | 15 | 10 | 60 | 0.0035 | 60 |
| 11 | 6 | 1.00 | 0.09 | 10 | 22 | 15 | 10 | 60 | 0.0035 | 60 |
| 12 | 7 | 0.50 | 0.04 | 4 | 22 | 15 | 10 | 60 | 0.0017 | 60 |
| 13 | 8 | 4.00 | 0.37 | 4 | 22 | 15 | 10 | 80 | 0.0100 | 60 |
| 14 | 9 | 1.00 | 0.20 | 4 | 22 | 15 | 10 | 60 | 0.0035 | 60 |
| 15 | 1 | 1.00 | 0.09 | 4 | 22 | 15 | 10 | 60 | 0.0052 | 40 |
| 16 | 1 | 1.00 | 0.09 | 4 | 22 | 15 | 10 | 60 | 0.0026 | 80 |
| 17 | 1 | 1.00 | 0.09 | 4 | 22 | 15 | 10 | 60 | 0.0035 | 60 |

TABLE 3-continued

| | Inorganic: fine particles | | | | Crystalline resin | | | | | |
|---|---|---|---|---|---|---|---|---|---|---|
| Toner Particle No. | No. | The amount C of the fatty acid which the inorganic fine particle has (mass %) | C/D | The difference between the number of carbon atoms of the fatty acid and the number of carbon atoms of $R^1$ | The number of carbon atoms of $R^1$ | The content of the monomer unit having any of a nitrile group, a carboxy group, a hydroxy group (mass %) | The content of the inorganic fine particle in the toner particle (mass %) | The content of the first monomer unit in the toner particle (mass %) | B · C/ 100 · A | The content of the crystalline resin having the first monomer unit in the binder resin (mass %) |
| 18 | 1 | 1.00 | 0.09 | 4 | 22 | 15 | 10 | 60 | 0.0035 | 60 |
| 19 | 1 | 1.00 | 0.09 | 4 | 22 | 15 | 10 | 60 | 0.0035 | 60 |
| 20 | 1 | 1.00 | 0.09 | 4 | 22 | 15 | 10 | 60 | 0.0035 | 60 |
| 21 | 1 | 1.00 | 0.09 | 4 | 22 | 15 | 10 | 60 | 0.0035 | 60 |
| 22 | 1 | 1.00 | 0.09 | 4 | 22 | 15 | 10 | 60 | 0.0035 | 60 |
| 23 | 1 | 1.00 | 0.09 | 4 | 22 | 15 | 10 | 60 | 0.0035 | 60 |
| 24 | 1 | 1.00 | 0.09 | 4 | 22 | 10 | 10 | 60 | 0.0035 | 60 |
| 25 | 1 | 1.00 | 0.09 | 4 | 22 | 45 | 10 | 45 | 0.0046 | 60 |
| 26 | 1 | 1.00 | 0.09 | 4 | 22 | 60 | 10 | 35 | 0.0060 | 60 |
| 27 | 1 | 1.00 | 0.09 | 4 | 22 | 3 | 10 | 60 | 0.0035 | 60 |
| 28 | 9 | 1.00 | 0.20 | 4 | 22 | 3 | 10 | 60 | 0.0035 | 60 |
| 29 | 2 | 1.00 | 0.15 | 4 | 22 | 3 | 10 | 60 | 0.0035 | 60 |
| 30 | 9 | 1.00 | 0.20 | 4 | 22 | 3 | 10 | 60 | 0.0035 | 60 |
| 31 | 9 | 1.00 | 0.20 | 4 | 22 | 3 | 10 | 60 | 0.0035 | 60 |
| 32 | 10 | 5.00 | 1.06 | 4 | 22 | 3 | 10 | 60 | 0.0174 | 60 |
| 33 | 11 | 0.10 | 0.02 | 4 | 22 | 3 | 2 | 60 | 0.0000 | 60 |
| 34 | 11 | 0.10 | 0.02 | 4 | 22 | 3 | 2 | 60 | 0.0001 | 30 |
| 35 | 13 | 0.10 | 0.03 | 4 | 22 | 3 | 2 | 60 | 0.0000 | 60 |
| 36 | 13 | 0.10 | 0.03 | 12 | 30 | 3 | 2 | 60 | 0.0000 | 60 |
| 37 | 14 | 0.03 | 0.01 | 4 | 22 | 3 | 2 | 60 | 0.0000 | 60 |
| 38 | 14 | 0.03 | 0.01 | 4 | 22 | 3 | 2 | 60 | 0.0000 | 60 |
| 39 | 14 | 0.03 | 0.01 | 4 | 22 | 3 | 2 | 10 | 0.0001 | 60 |
| 40 | 14 | 0.03 | 0.01 | 4 | 22 | 3 | 0.5 | 10 | 0.0000 | 60 |
| 41 | 14 | 0.03 | 0.01 | 4 | 22 | 3 | 30 | 10 | 0.0025 | 60 |
| 42 | 12 | 0.03 | 0.01 | — | — | — | 30 | — | — | 40 |

Symbols in Table 3 represent as follows:

A: the ratio of presence (mass %) of the first monomer unit represented by the formula (1) in the toner particles, B: the content (mass %) of the inorganic fine particles in the toner particles, C: the treatment amount (mass %) of the inorganic fine particles by the fatty acid, and D: the BET specific surface area ($m^2/g$) of the inorganic fine particles.

Moreover, regarding the toner particles 1, 6 to 42, which used only the calcium carbonate particles as the inorganic fine particles, the following measurement was also conducted.

[Method for Measuring X-Ray Diffraction]

For the X-ray diffraction measurement, a measuring apparatus "RINT-TTRII" (manufactured by Rigaku Corporation) and a control software and analysis software attached to the apparatus were used.

The measurement conditions were as follows:

X-ray: Cu/50 kV/300 mA

Goniometer: rotor horizontal goniometer (TTR-2)

Attachment: reference sample holder

Divergence slit: open

Divergence vertical limit slit: 10.00 mm

Scattering slit: open

Receiving slit: open

Counter: scintillation counter

Scanning mode: continuous

Scanning speed: 4.0000°/min.

Sampling width: 0.0200°

Scanning axis: 2θ/θ

Scanning range: 10.0000° to 40.0000°.

Subsequently, the toner particles were set on the sample plate to start the measurement.

X-ray diffraction spectra were obtained, where the Bragg angle is represented by θ, and the diffraction angle is represented by 2θ, 2θ was within a range of 3° or more to 35° or less, the diffraction angle 2θ was plotted on the horizontal axis, and the intensity of X-ray was plotted on the vertical axis in CuKα property X-ray.

The results of measurement of the "crystallite diameter" of the crystal to which the peak within 2θ=29.5°±0.5° was attributed, and the "peak intensity ratio" between the peak intensity of the crystal to which the peak within 2θ=26.5°±0.5° was attributed and the peak intensity of the crystal to which the peak within 2θ=29.5°±0.5° was attributed are shown in Table 4.

TABLE 4

| Toner particle number | Crystallite diameter [nm] | Peak Intensity Ratio |
|---|---|---|
| 1 | 30 | 0.17 |
| 6 | 30 | 0.17 |

TABLE 4-continued

| Toner particle number | Crystallite diameter [nm] | Peak Intensity Ratio |
|---|---|---|
| 7 | 30 | 0.17 |
| 8 | 30 | 0.17 |
| 9 | 30 | 0.17 |
| 10 | 30 | 0.17 |
| 11 | 30 | 0.17 |
| 12 | 30 | 0.17 |
| 13 | 30 | 0.17 |
| 14 | 30 | 0.16 |
| 15 | 30 | 0.17 |
| 16 | 30 | 0.17 |
| 17 | 30 | 0.17 |
| 18 | 30 | 0.17 |
| 19 | 30 | 0.17 |
| 20 | 30 | 0.17 |
| 21 | 14 | 0.17 |
| 22 | 40 | 0.17 |
| 23 | 30 | 0.22 |
| 24 | 30 | 0.17 |
| 25 | 30 | 0.17 |
| 26 | 30 | 0.17 |
| 27 | 48 | 0.16 |
| 28 | 50 | 0.13 |
| 30 | 50 | 0.13 |
| 31 | 50 | 0.13 |
| 32 | 50 | 0.13 |
| 33 | 50 | 0.13 |
| 34 | 50 | 0.13 |
| 35 | 50 | 0.13 |
| 36 | 50 | 0.13 |
| 37 | 50 | 0.13 |
| 38 | 50 | 0.13 |
| 39 | 50 | 0.13 |
| 40 | 50 | 0.13 |
| 41 | 50 | 0.13 |
| 42 | 50 | 0.13 |

<Example of Production of Toner 1>

0.5 parts of hydrophobic silica fine particles surface-treated with 4 mass % of hexamethyldisilazane and having a BET specific surface area of 25 $m^2/g$, and 0.5 parts of hydrophobic silica fine particles surface-treated with 10 mass % of polydimethylsiloxane and having a BET specific surface area of 100 $m^2/g$ were added to 100 parts of the toner particles 1, followed by mixing using a Henschel mixer (model FM-75, manufactured by Nippon Coke & Engineering Co., Ltd.) with a rotation speed of 30 $s^{-1}$ and a rotation time of 10 min to obtain a toner 1.

<Example of Production of Toners 2 to 42>

Toners 2 to 42 were obtained by conducting the same external addition of silica fine particles as described above on the toner particles 2 to 42.

<Example of Production of Magnetic Carrier 1>

A magnetite 1 having a number-average particle diameter of 0.30 μm, (the intensity of magnetization under a magnetic field of 1000/4π (kA/m) was 65 $Am^2/kg$)

A magnetite 2 having a number-average particle diameter of 0.50 μm, (the intensity of magnetization under a magnetic field of 1000/4π (kA/m) was 65 $Am^2/kg$)

To 100 parts of each of the above materials, 4.0 parts of a silane compound (3-(2-aminoethyl aminopropyl) trimethoxysilane) was added, followed by high-speed mixing and agitating at 100° C. or more in a container to treat fine particles of each material.

Phenol: 10 mass %

Formaldehyde solution: 6 mass % (40 mass % of formaldehyde, 10 mass % of methanol, and 50 mass % of water)

The magnetite 1 treated with the above silane compound: 58 mass %

The magnetite 2 treated with the above silane compound: 26 mass %

100 parts of the above materials, 5 parts of an aqueous solution of 28 mass % ammonia, and 20 parts of water were introduced into a flask, and the temperature was increased to 85° C. over 30 minutes and maintained while agitating and mixing, thereby causing a polymerization reaction for 3 hours to cure the phenolic resin generated.

Thereafter, the cured phenolic resin was cooled down to 30° C., water was further added thereto, and thereafter, the supernatant liquid was removed, and the precipitate was washed with water and dried with air.

Subsequently, this was dried at a temperature of 60° C. under a reduced pressure (5 mmHg or less) to obtain a magnetic body-dispersed spherical magnetic carrier 1. The 50% particle diameter (D50) in terms of volume of the magnetic carrier 1 was 34.2 μm.

<Example of Production of Two-Component Developer 1>

To 92.0 parts of the magnetic carrier 1, 8.0 parts of the toner 1 was added, followed by mixing using a V-type mixer (V-20, manufactured by Seishin Enterprise) to obtain a two-component developer 1.

<Example of Production of Two-Component Developers 2 to 42>

Two-component developers 2 to 42 were obtained in the same manner as in the two-component developer 1 except that the toners 2 to 42 were respectively used in place of the toner 1.

As an image forming apparatus, a modified machine of a printer for commercial digital printing (under the trade name of image RUNNER ADVANCE C9075 PRO, manufactured by Canon Inc.) was used.

The developing device of the modified machine was charged with the two-component developer of each toner, the DC voltage VDC of the developer carrier, the charged voltage VD of the electrostatic latent image carrier, and the laser power were adjusted such that the amount of the electrostatic latent image carrier or the amount of the toner placed on paper became a desired amount, and evaluations described later were conducted. The modification points in the modified machine were that the fusing temperature and the process speed were changed to be able to be freely set.

Example 1

The scratch resistance and the low-temperature fusibility were evaluated in accordance with the following methods using the two-component developer 1.

Test Example 1: Evaluation of Scratch Resistance

Paper: Oce Top Coated Plus Silk 270 g (270.0 $g/m^2$)

Amount of the toner placed: 0.20 $mg/cm^2$

Evaluation image: A monochromatic halftone image (5 cm×25 cm) was arranged on the above A4 paper.

Fusing test environment: An environment with ordinary temperature and ordinary humidity (temperature 23° C./humidity 50% RH)

Process speed: 450 mm/sec

Fusing temperature: 150° C.

An image obtained under the above conditions was cut into a strip shape, which was then set upward in the following apparatus.

Only the paper was set in the damper part, and the rubbing test was conducted under the following conditions.

Rubbing tester: a color fastness rubbing tester (AB-301)
Weight: 500 g (0.5 kgf)
Stroke: 10 reciprocations To the paper which was rubbed (rubbed paper), the toner was transferred, and for this rubbed paper and white paper, the L*, a*, and b* of the image at each gradation was measured using SpectroScan Transmission (manufactured by GretagMacbeth) (measurement condition: D50, viewing angle=2°). When the L*, a*, and b* of the white paper was represented by L0*, a0*, and b0* and the L*, a*, and b* of the rubbed paper was represented by L1*, a1*, and b1*, ΔE obtained by the following formula was compared and used as criteria for scratch evaluation.

$$\Delta E=\{(L1^*)^2+(a1^*)^2+(b1^*)^2\}^{0.5}-\{(L0^*)^2+(a0^*)^2+(b0^*)^2\}^{0.5}$$

The lower the ΔE is, the better the scratch resistance is. The evaluation results are shown in Table 5.

(Evaluation Criteria)
AAA: less than 2.0
AA: 2.0 or more to less than 2.5
A: 2.5 or more to less than 3.0
BBB: 3.0 or more to less than 3.5
BB: 3.5 or more to less than 4.0
B: 4.0 or more to less than 4.5
CCC: 4.5 or more to less than 5.0
CC: 5.0 or more to less than 5.5
C: 5.5 or more to less than 6.0
DDD: 6.0 or more to less than 6.5
DD: 6.5 or more to less than 7.0
D: 7.0 or more to less than 7.5
EEE: 7.5 or more to less than 8.5
EE: 8.5 or more to less than 10.0
E: 10.0 or more

Test Example 2: Evaluation of Low-Temperature Fusibility

Paper: CF-C104 (104.0 g/m$^2$)
(sold by Canon Marketing Japan Inc.)
Amount of the toner placed on paper: 0.90 mg/cm$^2$
Evaluation image: An image of 25 cm$^2$ was arranged in a center of the above A4 paper.
Fusing test environment: An environment with a low temperature and a low humidity: temperature 15° C./humidity 10% RH (hereinafter, "L/L")

After the DC voltage VDC of the developer carrier, the charged voltage VD of the electrostatic latent image carrier, and the laser power were adjusted such that the amount of the toner placed on paper became as described above, the low-temperature fusibility was evaluated with the process speed being set to 300 mm/sec and the fusing temperature being set to 130° C. The value of the percentage of decrease in image density was used as criteria for evaluation of low-temperature fusibility. The percentage of decrease in image density was obtained as follows: using X-rite color reflection densitometer (series 500: manufactured by X-Rite Inc.), first, an image density in a center portion was measured. Next, the fused image in the portion where the image density was measured was rubbed (5 reciprocations) using Silbon paper with a load of 4.9 kPa (50 g/cm$^2$), and the image density was measured again. Then, the percentage (%) of decrease in image density between before and after the rubbing was measured.

The evaluation criteria were set as follows. The evaluation results are shown in Table 5.

[Evaluation Criteria]
A: less than 1.0
B: 1.0 or more to less than 3.0
C: 3.0 or more to less than 6.0
D: 6.0 or more to less than 10.0
E: 10.0 or more

Examples 2 to 39, Comparative Examples 1 to 3

The same evaluations were conducted in the same manner as in Example 1 except that the two-component developers 1 to 42 were used in place of the two-component developer 1. The evaluation results are shown in Table 5.

TABLE 5

| Example/Comparative Example | Scratch Resistance Evaluated Rank | Low-temperature Fusibility Evaluated Rank |
|---|---|---|
| Example 1 | AAA | A |
| Example 2 | A | A |
| Example 3 | A | A |
| Example 4 | A | A |
| Example 5 | A | A |
| Example 6 | AA | A |
| Example 7 | AA | A |
| Example 8 | AAA | A |
| Example 9 | AAA | B |
| Example 10 | AAA | A |
| Example 11 | A | A |
| Example 12 | AA | A |
| Example 13 | AA | A |
| Example 14 | A | A |
| Example 15 | AA | B |
| Example 16 | AA | A |
| Example 17 | AA | A |
| Example 18 | AA | A |
| Example 19 | AA | A |
| Example 20 | AAA | A |
| Example 21 | AA | A |
| Example 22 | AA | A |
| Example 23 | AA | A |
| Example 24 | AA | B |
| Example 25 | AA | C |
| Example 26 | AA | D |
| Example 27 | A | D |
| Example 28 | BBB | D |
| Example 29 | BB | D |
| Example 30 | B | D |
| Example 31 | B | D |
| Example 32 | CC | D |
| Example 33 | CCC | D |
| Example 34 | C | E |
| Example 35 | DDD | C |
| Example 36 | DDD | D |
| Example 37 | DD | C |
| Example 38 | DD | C |
| Example 39 | D | D |
| Comparative Example 1 | EEE | D |
| Comparative Example 2 | EEE | E |
| Comparative Example 3 | EE | D |

The present disclosure can provide a toner that has a favorable low-temperature fusibility and is excellent in scratch resistance of an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-098008, filed Jun. 11, 2021, and Japanese Patent Application No. 2022-077314, filed May 10, 2022, which are hereby incorporated by reference herein in their entirety.

What is claimed is:

1. A toner, comprising:

a toner particle containing a binder resin and an inorganic fine particle;

the binder resin containing a crystalline resin having a first monomer unit represented by formula (1)

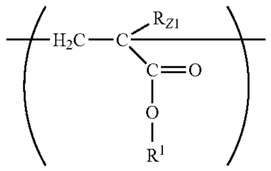

(1)

where $R_{Z1}$ represents a hydrogen atom or a methyl group, and $R^1$ represents an alkyl group having 18 to 36 carbon atoms;

the inorganic fine particle being at least one member particle selected from the group consisting of a particle containing $CaCO_3$, a particle containing $BaSO_4$, a particle containing $Mg_3Si_4O_{10}(OH)_2$ and a particle containing $Al_2Si_2O_5(OH)_4$, wherein the inorganic fine particle is treated with a fatty acid, a content B of the inorganic fine particle in the toner particle is 1.0 to 15.0 mass %, and the inorganic fine particle has a BET specific surface area of 4.5 to 25.0 $m^2/g$.

2. The toner according to claim 1, wherein a content X of the first monomer unit in the crystalline resin is 30 mass % or more.

3. The toner according to claim 1, wherein the inorganic fine particle has a number-average particle diameter of 100 to 500 nm.

4. The toner according to claim 1, wherein the number of carbon atoms of the fatty acid is 12 to 18.

5. The toner according to claim 1, wherein the inorganic fine particle comprises 0.1 to 5.0 mass % of the fatty acid.

6. The toner according to claim 1, wherein a difference between the number of carbon atoms of the fatty acid and the number of carbon atoms of $R^1$ is 5 or less.

7. The toner according to claim 1, wherein the binder resin comprises at least 40 mass % of the crystalline resin.

8. The toner according to claim 1, wherein $0.0001 \leq B \times C/(100 \times A) \leq 0.0100$ when A (mass %) is a content of the first monomer unit represented by formula (1) in the toner particle, and C (mass %) is an amount of fatty acid in the inorganic fine particle.

9. The toner according to claim 1, wherein $0.015 \leq C/D \leq 0.500$ when C (mass %) is an amount of fatty acid in the inorganic fine particle, and D ($m^2/g$) is a BET specific surface area of the inorganic fine particle.

10. The toner according to claim 1, wherein the crystalline resin contains 5 to 50 mass % of a monomer unit having at least one of a nitrile group, a carboxy group, or a hydroxy group.

11. A toner, comprising:

a toner particle containing a binder resin and a calcium carbonite fine particle;

the binder resin containing a crystalline resin having a first monomer unit represented by formula (1)

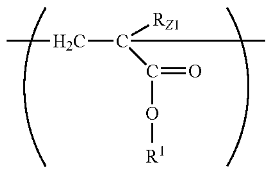

(1)

where $R_{Z1}$ represents a hydrogen atom or a methyl group, and $R^1$ represents an alkyl group having 18 to 36 carbon atoms, wherein the calcium carbonite fine particle is treated with a fatty acid, a content of the calcium carbonite fine particle in the toner particle is 1.0 to 15.0 mass %, and a crystallite diameter of a crystal to which a peak within $2\theta=29.5°\pm0.5°$ is attributed is 10 to 45 nm, and a ratio between a peak intensity within $2\theta=26.5°\pm0.5°$ and a peak intensity within $2\theta=29.5°\pm0.5°$ is 0.15 to 0.24 in an X-ray diffraction measurement using a CuKα ray on the toner particle, when θ is a Bragg angle, and the calcium carbonate particle has peaks within a range of $2\theta=26.5°\pm0.5°$ and $2\theta=29.5°\pm0.5°$.

12. The toner according to claim 11, wherein the calcium carbonate particle has a spindle shape.

* * * * *